US012800782B2

(12) United States Patent
Mundim et al.

(10) Patent No.: US 12,800,782 B2
(45) Date of Patent: Nov. 17, 2026

(54) METHOD FOR SEPARATING INFORMATION ASSOCIATED WITH DIFFRACTION EVENTS FROM SPECULAR INFORMATION PRESENT IN THE SEISMIC DATA

(71) Applicants: PETRÓLEO BRASILEIRO S.A.—PETROBRAS, Rio de Janeiro (BR); UNIVERSIDADE ESTADUAL DE CAMPINAS—UNICAMP, Campinas (BR)

(72) Inventors: Evaldo Cesario Mundim, Rio de Janeiro (BR); Caian Benedicto, Campinas (BR); Jorge Henrique Faccipieri, Jr., Campinas (BR); Dany Rueda Serrano, Campinas (BR); Martin Tygel, Campinas (BR); Tiago Antonio Alves Coimbra, Campinas (BR)

(73) Assignees: Petróleo Brasileiro S.A.—Petrobras, Rio de Janeiro (BR); Universidade Estadual De Campinas—Unicamp, Campinas (BR)

( * ) Notice: Subject to any disclaimer, the term of this patent is extended or adjusted under 35 U.S.C. 154(b) by 482 days.

(21) Appl. No.: 18/365,795

(22) Filed: Aug. 4, 2023

(65) Prior Publication Data

US 2024/0045090 A1 Feb. 8, 2024

(30) Foreign Application Priority Data

Aug. 5, 2022 (BR) ...................... 10 2022 015557 7

(51) Int. Cl.
*G01V 1/28* (2006.01)
*G01V 1/36* (2006.01)

(52) U.S. Cl.
CPC .............. *G01V 1/288* (2013.01); *G01V 1/364* (2013.01)

(58) Field of Classification Search
CPC ........ G01V 1/288; G01V 1/364; G01V 1/303; G01V 1/30
See application file for complete search history.

(56) References Cited

U.S. PATENT DOCUMENTS 6,778,909 B1 * 8/2004 Popovici .................. G01V 1/28 702/17
8,902,709 B2 * 12/2014 Jaiswal .................. G01V 1/301 367/73

(Continued)

FOREIGN PATENT DOCUMENTS

WO WO-2016064483 A1 * 4/2016 ............... G01V 1/38

OTHER PUBLICATIONS

WO-2016064483-A1_translated (Year: 2016).*

(Continued)

*Primary Examiner* — Catherine T. Rastovski
*Assistant Examiner* — Michael J Singletary
(74) *Attorney, Agent, or Firm* — Knobbe, Martens, Olson & Bear, LLP

(57) ABSTRACT

The present invention relates to a method for separating information associated with diffraction events from specular information present in the seismic data, the method comprising the steps of: obtaining an input data, wherein the input data is a pre-stacked seismic data; building velocity guides, which comprises providing a table containing velocity information for time samples for different CDPs (Common-Depth Points) indices; estimating DSR (Double Square Root) kinematic parameters, which comprises estimating kinematic parameters associated with the DSR traveltime for each sample of the input data considering an estimation (Continued)

aperture, which comprises the region in which the DSR traveltime adjustment to the input data will be evaluated; DSR stacking of each input data sample considering a stacking aperture, which comprises the region in which the input data amplitudes will be stacked over the DSR traveltime; and DSR spreading each sample of the pre-stacked data, comprising defining a aperture, wherein the aperture comprises the region in which the amplitudes of the DSR stacked data, obtained in the DSR stacking step over the DSR traveltime, are distributed.

8 Claims, 11 Drawing Sheets

(56) References Cited

U.S. PATENT DOCUMENTS

| | | | | |
|---|---|---|---|---|
| 9,733,371 | B2 * | 8/2017 | Burnett | G01V 1/30 |
| 2020/0379136 | A1 * | 12/2020 | Ji | G01V 1/364 |

OTHER PUBLICATIONS

Coimbra et al. 2019, Enhancement of diffractions in pre-stack domain by means of finite-offset double-square-root travel time. Geophysics, 84(1): 1-83 (Year: 2019).*

Coimbra et al., 2019, Enhancement of diffractions in pre-stack domain by means of a finite-offset double-square-root travel time. Geophysics, 84(1):1-83.

Coimbra et al., Aug. 3-6, 2015, Enhancement of stacked sections using ZO CRS parameters, 14th International Congress of the Brazilian Geophysical Society & EXPOGEF, Rio de Janeiro, Brazil, 5 pp.

Coimbra et al., Sep.-Oct. 2016, Offset-continuation stacking: theory and proof of concept, Geophysics, 81(5):V387-V401.

Decker et al., 2014, Diffraction imaging and velocity analysis using oriented velocity continuation, SEG Denver 2014 Annual Meeting, pp. 4810-4815.

Faccipieri et al., 2016, Stacking apertures and estimation strategies for reflection and diffraction enhancement., Geophysics, 81(4):V271-V282.

Neidell et al., Jun. 1971, Semblance and other coherency measures for multichannel data, Geophysics, 36(3):482-497.

Ribeiro et al., 2019, Using Adaptive Differential Evolution algorithm to improve parameter estimation in seismic processing, Proceedings of the 16th International Congress of the Brazilian Geophysical Society & Expogef, 6 pp.

Ribeiro et al., 2020, Using adaptive differential evolution algorithm to improve parameter estimation in seismic processing: extended results, Brazilian Journal of Geophysics, 38(3):1-11.

Silvestrov et al., Jun. 16-19, 2014, Post-stack diffraction imaging using reverse-time migration, 76th EAGE Conference & Exhibition, Amsterdam RAI, The Netherlands, 5 pp.

Speglich et al., 2019, Construction of 3D and 5D D-volumes in pre-stack domain, SEG International Exposition and Annual Meeting, pp. 3964-3968.

* cited by examiner

METHOD FOR SEPARATING INFORMATION ASSOCIATED WITH DIFFRACTION EVENTS FROM SPECULAR INFORMATION PRESENT IN THE SEISMIC DATA

FIELD OF THE INVENTION

The present invention pertains to the technical field of seismic data processing. More specifically, the present invention relates to a method for separating information associated with diffraction events from the specular information present in the seismic data.

BACKGROUND OF THE INVENTION

Within the scope of exploration and production of hydrocarbon reservoirs, geological structures such as faults, pinch-outs, salt flanks and karsts are characterized as events of considerable importance in this area. Specifically, geological structures are recorded in seismic data as diffraction events rather than reflection events. In this way, due to the spreading and energy dispersion nature of these events, in most cases, the diffractions are obfuscated by reflection events, making their detection and imaging a challenging task.

Particularly, the diffracted waves have been widely investigated because of their importance, both theoretically for understanding wave propagation in complex geologies, and practically in the processing, imaging, inversion and interpretation of seismic data. The effective utilization of the diffraction energy contained in seismic data depends on the ability of the processing techniques to separate diffractions from reflections. In this context, the attenuation of reflection events is essential so that the diffractions become visible and can be treated.

Among the techniques capable of attenuating reflection events and enhancing diffractions, it is possible to mention the stacking and spreading techniques, considering specific traveltimes for these diffraction events.

The experiments conducted by Faccipieri, J. H., Coimbra, T. A., Gelius, L. J., & Tygel, M., Stacking apertures and estimation strategies for reflection and diffraction enhancement. Geophysics, v. 81, n. 4, 2016 (hereinafter, Faccipieri et al., 2016), demonstrated that the Double Square Root (DRS) is the most suitable traveltime to adjust diffraction events, since it provides the exact time response for a diffractor point in a homogeneous medium. Furthermore, this study considered a formulation capable of building zero offset (ZO) sections, that is, a stacked section.

In particular, sections in the stacked domain, which simulate zero offset sections, are not the best configurations for the type of situation in the Brazilian pre-salt. Complex geologies, such as the pre-salt, require approaches in the pre-stacked or finite offset (FO) domain, that is, capable of providing pre-stacked data as a result.

As well established in the processing of seismic data, processing in the pre-stacked domain allows the extraction of valuable information from the events of interest, in particular, the diffractions, which would not be possible in stacked data. In particular, more sophisticated migration techniques, such as Reverse Time Migration (RTM), require pre-stacked data for their proper application. It is worthy to emphasize that, due to its greater theoretical and computational simplicity, the stacked domain is the initial stage for the development of processing techniques, with its extension to the pre-stacked domain being later.

STATE OF THE ART

In the state of the art, there are some methods for diffraction separation of specular information in seismic data, as indicated below.

U.S. Pat. No. 9,733,371B2 discloses a method for obtaining a subsurface image of seismic data. Said method comprises migrating individual traces of seismic data, without any stacking and assembling of midpoints; perform at least one processing technique on the individual migrated traces, resulting in processed data in the midpoint domain; forming and displaying a seismic image of the subsurface directly from the individual migrated traces processed in the midpoint domain, wherein forming includes at least partially stacking offsets and mounting separate migration midpoints, wherein the seismic image identifies the location of the structure in the Earth subsurface, which returns seismic waves to receive the recorded seismic data.

Additionally, the paper *Diffraction imaging and velocity analysis using oriented velocity continuation* by Luke Decker and Sergey Fomel, from the Texas University, discloses a method for generating seismic diffraction images and velocity analysis by separating diffractions from specular reflections and decomposing the same in slope components. It is mentioned that the slope component images are generated using extrapolation on the migration velocity in space-time-slope coordinates. The document in question discloses that the extrapolation is described by a convection-type partial differential equation and efficiently implemented in the Fourier domain.

The document *Post-stack diffraction imaging using reverse-time migration* discloses a method for imaging small-scale diffraction objects in complex environments, wherein Kirchhoff-based approaches may fail. In that document, it is described that the method is based on a separation between the specular reflection and the diffraction components of the total wavefield in the domain of the migrated surface angle. Reverse Time Migration was used to produce the families of common surface angle (surface angle common image gather). The separation is based on the fact that at surface angles the common image comes together, reflection events are focused at positions that correspond to the apparent dip angle of the reflectors, while diffracted events are distributed over a wide range of angles. High-resolution radon-based events are used to separate the reflection and diffraction wave fields.

As can be seen from the description of the above-indicated documents of the state of the art, there are methods to obtain a subsurface image of seismic data, images of seismic diffractions and velocity analysis by separating diffractions from specular reflections and methods for imaging of small-scale diffraction objects in complex environments.

The advantage of the method of the present invention, whose description will follow later, is to allow the generation of diffraction cubes that are indicators of karstified and/or fractured areas (high permeability). Knowledge of these areas is important in the Development and Production process of a field to maximize recovery factor and improve well performance. This information is also useful in predicting areas of loss of circulation during the drilling of oil wells.

BRIEF DESCRIPTION OF THE INVENTION

The present invention relates to a method for separating information associated with diffraction events from specular information present in the seismic data, the method comprising the steps of: obtaining an input data, wherein the input data is a pre-stacked seismic data; building velocity guides, which comprises providing a table containing velocity information for time samples for different CDPs (Common-Depth Points) midpoint indices; estimating DSR (Double Square Root) kinematic parameters, which comprises estimating kinematic parameters associated with the DSR traveltime for each sample of the input data considering an estimation aperture, which comprises the region in which the DSR traveltime adjustment to the input data will be evaluated; DSR stacking of each input data sample considering a stacking aperture, which comprises the region in which the input data amplitudes will be stacked over the DSR traveltime; and DSR spreading each sample of the pre-stacked data, comprising defining a aperture, wherein the aperture comprises the region in which there are distributed the amplitudes of the DSR stacked data obtained in the DSR stacking step over the DSR traveltime.

BRIEF DESCRIPTION OF FIGURES

In order to complement the present description and obtain a better understanding of the features of the present invention, and according to a preferred embodiment thereof, in the annex, a set of figures is presented, where in an exemplified although not limiting manner there is represented the preferred embodiment thereof.

DETAILED DESCRIPTION OF THE INVENTION

Figure 1:
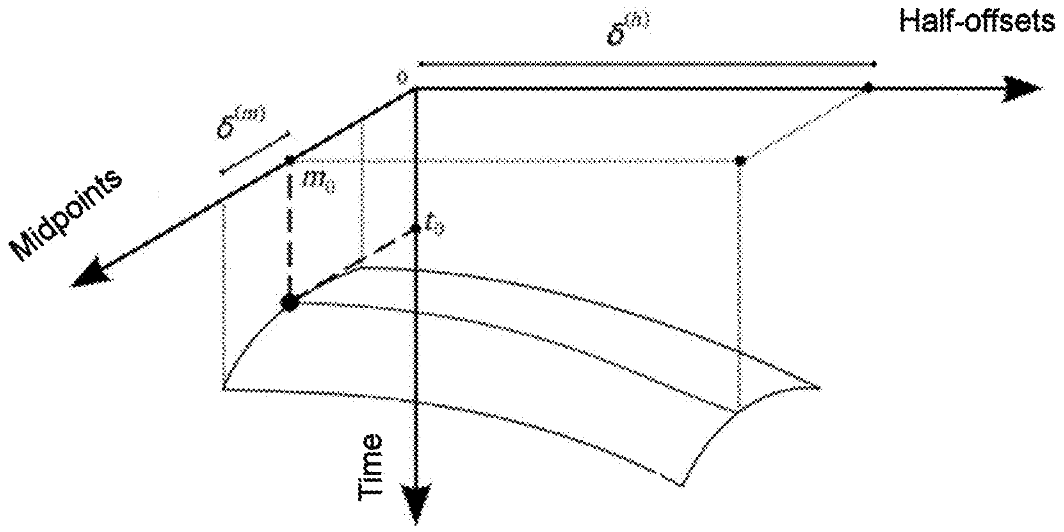
FIG. 1 presents the volume of data representing the directions of midpoints and half-offsets and their respective apertures for a seismic data with 2D acquisition.

The method for separating information associated with diffraction events from specular information present in the seismic data, according to a preferred embodiment of the present invention, is described in detail, based on the figures, which are attached.

Diffractions Separation in the Zero Offset Domain

The sections or volumes of diffractions (in cases of 2D acquisitions or 3D acquisitions, respectively) are built through stacking and spreading steps, which reinforce diffraction events and attenuate reflection events. For this purpose, a specific traveltime equation is used, which adjusts to the diffraction events, wherein such an equation, of the Double Square Root (DSR) type, describes the exact time response for an unknown diffractor point in a medium of homogeneous velocity for source-receiver pairs in the vicinity of a reference source-receiver pair of zero offset, ZO (zero offset), as observed in Faccipieri et al., 2016. For the case of a 3D seismic acquisition, the traveltime equation for zero offset is defined as equation 1, below:

$$\text{Where: } \Delta s = m - h;\ t_{DSR}(m, h) = \frac{1}{2}\left[\sqrt{(t_0 + a^T\Delta s)^2 + \Delta s^T C \Delta s} + \sqrt{(t_0 + a^T\Delta r)^2 + \Delta r^T C \Delta r}\right]. \quad \text{(equation 1)}$$

$\Delta r = m + h$, where m and h are 2×1 vectors with midpoint and half-offset coordinates, respectively; and a and C are the parameters to be estimated from the seismic data.

Specifically, the parameter a of equation 1, where $a=(a_0, a_1)$, represents a 2×1 vector associated with the slope of the diffraction event in the inline ($a_0$) and crosslines ($a_1$) directions.

In turn, the parameter C of equation 1 represents a symmetric 2×2 matrix associated with a stacking velocity. The matrix C can be reduced to a scalar c multiplied by the identity matrix, for simplicity and without loss of result quality. Furthermore, parameter C is related to velocity as follows: $C=4(v^2)^{-1}$. In the case of a 2D seismic acquisition, the 2×1 vector a of slopes and the displacements Δs and Δr become scalars and the equation starts to depend only on two parameters, a and v.

The parameter estimation process is carried out through consistency analysis via Semblance (Neidell and Turhan, 1971) by means of a global search. That is, all the parameters that define the traveltime equation are simultaneously estimated. The parameters can be estimated using a metaheuristics of differential evolution, similar to that described by Ribeiro et al. (RIBEIRO, JOSÉ; Coimbra, Tiago A.; OKITA, NICHOLAS T.; IGNÁCIO, GUSTAVO B.; TYGEL, MARTIN. *Using adaptive differential evolution algorithm to improve parameter estimation in seismic processing: extended results.* Revista Brasileira de Geofisica (Print), v. 38, p. 1-11, 2021) and Ribeiro et al. (RIBEIRO, JOSÉ; OKITA, NICHOLAS; COIMBRA, TIAGO; IGNÁCIO, GUSTAVO; TYGEL, MARTIN. *Using Adaptive Differential Evolution algorithm to improve parameter estimation in seismic processing.* In: International Congress of the Brazilian Geophysical Society & Expogef, 2019, Rio de Janeiro. Proceedings of the 16th International Congress of the Brazilian Geophysical Society & Expogef, 2020. p. 1-6), for example. It is worth mentioning that parameter estimation has no direct relation with the diffractions separation technique itself; it is just a tool to obtain the necessary kinematic parameters for defining the traveltime surface.

The parameter estimation process is carried out for all samples of the data, considering an estimation aperture, that is, an area in which the different combinations of traveltime parameters will have their coherence evaluated. The set of parameters that achieves the highest coherence value, that is, the highest Semblance value, is selected and used to stack the data in that sample. A schematic representation of the DSR traveltime surface, as well as the estimation δ(m) and stacking δ(h) apertures can be seen, for the 2D case, in FIG. 1.

Specifically, FIG. 1 shows the volume of data representing the directions of midpoints and half-offsets for a seismic data with 2D acquisition. A DSR traveltime surface is plotted for a point of coordinate $m_0$ and time $t_0$ with estimation δ(m) and stacking δ(h) apertures for midpoints and offset, respectively.

The definition of the ideal apertures to achieve the best degree of separation of events is a complex task, which depends on experiments to be carried out by the user. Diffractions, by strict mathematical definition, require infinite apertures; therefore, there is no upper limit for them. However, in practice, it is necessary to define a lower physical limit, that is, a minimum aperture from which the separation of a reflection event from a diffraction event occurs. In this way, the minimum aperture in the direction of midpoints can be defined by equation 2, below, wherein apertures smaller than or equal to the values obtained by equation 2 are not capable of differentiating reflection events from diffraction events.

$$\delta_{ref} = \frac{v_{NMO}}{2}\sqrt{\frac{wt_0}{2}} \quad \text{(equation 2)}$$

Where:

$v_{NMO}$ represents the NMO (Normal Moveout) velocity, in meters per second, computed at the estimation point of interest;

w represents the pulse width, in seconds, computed at the estimation point of interest; and $t_0$ defines the time, in seconds, computed at the estimation point of interest.

More theoretical details about estimating apertures can be found in Faccipieri et al., 2016. As a general rule, it is recommended to use initial aperture values at least twice as large as the minimum aperture obtained by equation 2.

Once the DSR traveltime parameters are estimated for all samples of the zero offset section, the amplitude spreading step is performed.

The step of spreading the amplitudes can be interpreted as a refinement of the results, where artifacts are removed and problems associated with conflicting dips are corrected.

Specifically, in the amplitude spreading step, for each sample of the stacked diffraction section, the stacked amplitude is spread, that is, distributed (dividing the amplitude by the number of traces present in the aperture), along the DSR traveltime curve defined by the parameters of that sample, which can be understood as an "inverse stacking", similar to that applied in a Kirchhoff migration, which spreads amplitudes along an isochron defined by the velocity in that position. In this case, the amplitude of a given sample is evenly distributed along the DSR traveltime curve defined by the DSR parameters of that sample. The result of this process is a data with attenuated estimation noise and artifacts and with well-solved conflicting dips. This occurs because the amplitudes belonging to the same diffraction event overlap, increasing its amplitude due to a constructive interference. Events that do not coherently overlap, such as noises and reflections, are attenuated since the spread amplitudes do not constructively accumulate.

Figure 2:
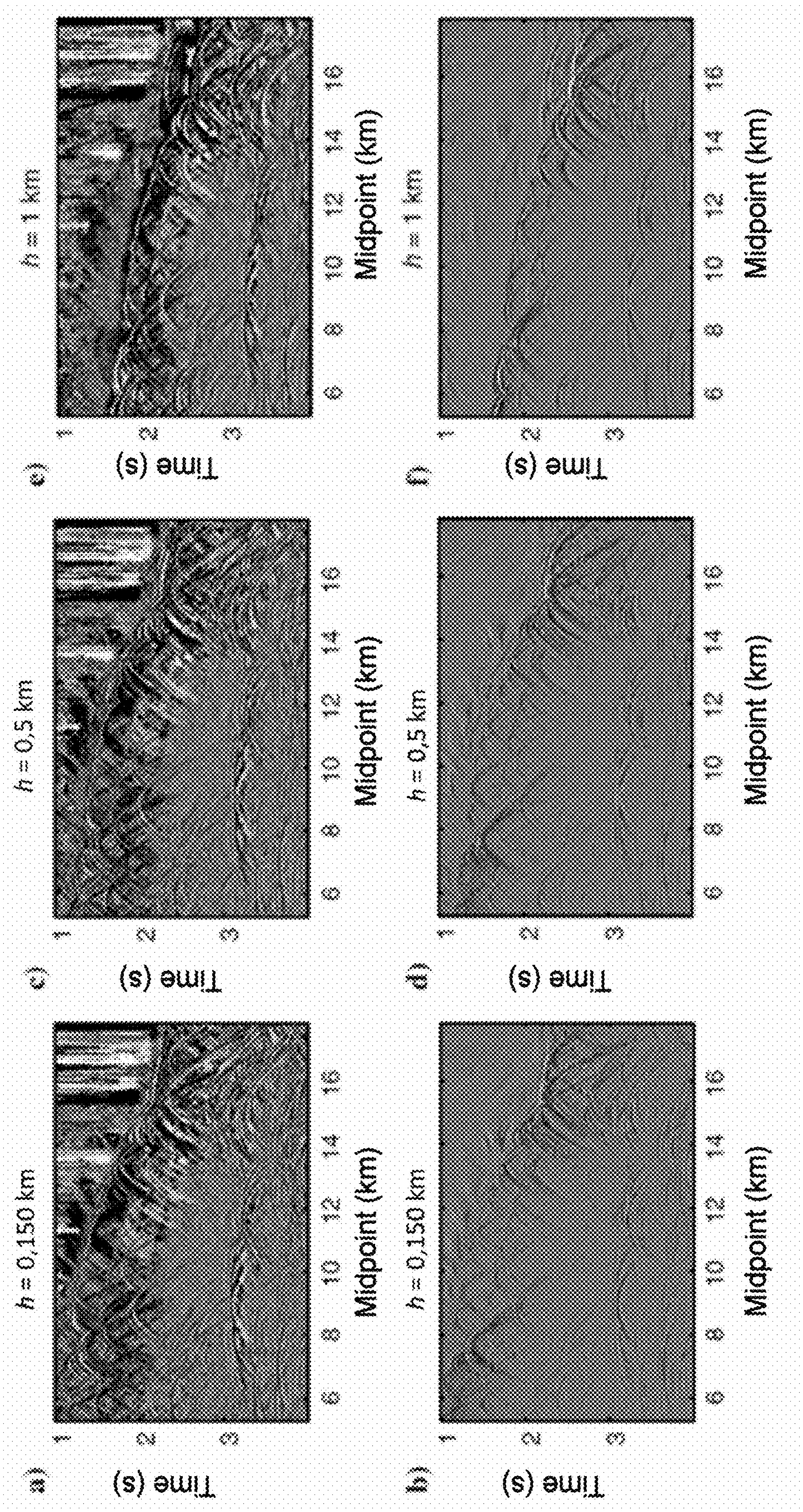
FIG. 2 illustrates an actual 2D data, in finite half-offset panels obtained by DSR stacking and DSR spreading.

FIG. 2 shows examples of results obtained in the stacking process and after the amplitude spreading step, along the same DSR traveltime surface for the finite offset case, but the same can be observed for the case of zero offset.

Specifically, FIG. 2 shows an actual 2D data, which displays finite offset panels obtained by stacking DSR for offsets of (a) 150 m, (b) 500 m and (c) 1000 m (above). In addition, it also shows the spread result for the offsets of (a) 150 m, (b) 500 m and (c) 1000 m (below).

In addition, the process of spreading the amplitudes also depends on the definition of apertures to which the amplitudes will be distributed; for this, it is recommended to use apertures equal to or smaller than the apertures used in the stacking process. More theoretical details about the spreading step can be seen in Coimbra, T. A., Faccipieri, J. H., Gelius, L. J., & Tygel, M. *Enhancement of stacked sections using ZO CRS parameters*. In 14th International Congress of the Brazilian Geophysical Society & EXPOGEF, Rio de Janeiro, Brazil, 3-6 Aug. 2015. Brazilian Geophysical Society, 2015 (hereinafter, Coimbra et al., 2015,) and Coimbra, T. A., Faccipieri, J. H., Speglich, J. H., Gelius, L. J., & Tygel, M., *Enhancement of diffractions in pre-stack domain by means of a finite-offset double-square-root traveltime*. Geophysics, v. 84, n. 1, 2019 henceforth, Coimbra et al., 2019,).

Diffractions Separation in the Finite Offset Domain

The DSR traveltime formulation for zero offset can be generalized to operate in the finite offset domain (FO). In this formulation, the traveltime equation can act on all samples of the pre-stacked data and perform the separation of events in this same domain. This process can further preserve or regularize (reposition the traces), if necessary. As in the case of diffractions separation in the zero offset domain, a traveltime equation of the Double Square Root DSR type is used (which satisfies the zero offset situation, as a particular case), which describes the exact time response for an unknown diffractor point in a homogeneous velocity medium for source-receiver pairs in the vicinity of a reference source-receiver pair of arbitrary offset, whether it is of zero offset or finite offset. For the case of 3D acquisition, the generalized equation can be found in Coimbra et al., 2019. However, in order to reduce the computational cost, without appreciable loss of generality, a simplified version is used, defined in equation 3, as:

$$t_{DSR_{FO}}(m,h) = \sqrt{\left(t_{0s}^2 + 2t_{0s}^2 a_s^T(\Delta m - \Delta h) + (\Delta m - \Delta h)^T 1/4S(\Delta m - \Delta h)\right.} + \sqrt{\left(t_{0r}^2 + 2t_{0r}^2 a_r^T(\Delta m + \Delta h) + (\Delta m + \Delta h)^T 1/4S(\Delta m + \Delta h)\right.} \quad \text{(equation 3)}$$

$$\text{wherein: } a_s = \frac{a_m - a_h}{2},\ a_r = \frac{a_m + a_h}{2},\ \text{and}$$

$$a_h = \frac{2t_0\left(S - a_m a_m^T\right)h_0}{\left(t_0^2 + h_0^T S h_0\right) + \sqrt{\left(t_0^2 + h_0^T S h_0\right)^2 - 4t_0^2 h_0^T\left(S - a_m a_m^T\right)h_0}},$$

where:

$t_{0s}$ and $t_{0r}$ represent times between the source and the diffractor point and the time between the receiver and the same diffractor point;

$t_0$ represents the total time measured for the reference source-receiver pair;

$a_s$, $a_r$ are vectors 2×1 vectors, functions of $a_m = a_m(m, h_{0,t})$ and $a_h = a_h(m, h_{0,t})$, obtained for a reference point $(m, h_{0,t})$; and $S=S(m,h_{0,t})$ represents a symmetric 2×2 matrix, obtained for a reference point $(m,h_{0,t})$.

The times $t_{0s}$ and $t_{0r}$ are unknown, but their sum represents the total time measured for the reference source-receiver pair, $t_0$.

As in the case of zero offset, the matrix S can be reduced to a scalar s multiplied by the identity matrix.

Note that parameter s relates to velocity as follows: $s=4(v^2)^{-1}$. The result of this simplification depends on five parameters for the 3D case and three parameters for the 2D case. For the case of a 3D acquisition, the five parameters consist of: Two 2×1 vectors of slopes, evaluated for the directions of midpoints $a_m$ and offsets $a_h$, whose components represent slopes in the inline and crossline directions (totaling 4 parameters); and a velocity value, v. In the case of a 2D acquisition, the three parameters are: two slopes computed with respect to midpoints $a_m$ and offsets $a_h$, respectively; and a velocity v.

The parameter estimation process, as discussed above in the case of zero offset, is performed through coherence analysis via Semblance (Neidell and Turhan, 1971) by means of a global search. That is, all parameters that define the traveltime equation are estimated simultaneously. The parameters can be estimated using a metaheuristics of differential evolution, similar to that described by Ribeiro et al. (RIBEIRO, JOSÉ; Coimbra, Tiago A.; OKITA, NICHOLAS T.; IGNÁCIO, GUSTAVO B.; TYGEL, MARTIN. *Using adaptive differential evolution algorithm to improve parameter estimation in seismic processing: extended results*. Revista Brasileira de Geofisica (Print), v. 38, p. 1-11, 2021.), Ribeiro et al. (RIBEIRO, JOSÉ; OKITA, NICHOLAS; COIMBRA, TIAGO; IGNÁCIO, GUSTAVO; TYGEL, MARTIN. *Using Adaptive Differential Evolution algorithm to improve parameter estimation in seismic processing*. In: International Congress of the Brazilian Geophysical Society & Expogef, 2019, Rio de Janeiro. Proceedings of the 16th International Congress of the Brazilian Geophysical Society & Expogef, 2020. p. 1-6), for example. It is worth mentioning that parameter estimation has no direct relation with the diffractions separation technique itself; it is just a tool to obtain the necessary kinematic parameters for defining the traveltime surface.

This parameter estimation process is carried out within an estimation aperture, that is, an area in which the different combinations of DSR traveltime parameters have their coherence computed. The set of parameters that achieves the highest coherence value is selected and used to stack the data in that sample. With respect to estimating apertures, stacking and spreading, the same considerations described above for the zero offset case also apply to the finite offset. Further theoretical details on the parameter estimation process can be found in the works of Coimbra et al., 2019), Faccipieri et al., 2016, as well as in Speglich, J. H., Faccipieri, J. H., Okita, N. T., Coimbra, T. A., & Tygel, M., Construction of 3D and 5D D-volumes in pre-stack domain. In: SEG International Exposition and Annual Meeting. OnePetro, 2019 (hereinafter, Speglich et al., 2019).

Additionally, FIG. 2 presents an application example of diffractions separation in the finite offset domain for the case of 2D acquisitions in a marine actual data. In the upper part of FIG. 2, the results obtained in the application of the stacking process for three different offsets (150 m, 500 m and 1000 m) are observed, where it is possible to notice estimation artifacts, noises associated with residual reflections and conflicting dips. In the lower part of FIG. 2, it is possible to observe the results obtained after the spreading process for each of the presented offsets, namely 150 m, 500 m and 1000 m. The same parameters used in stacking are used to spread the amplitudes, that is, to distribute the amplitudes.

In this case, a spreading aperture equal to half of the stacking aperture was used. As can be seen in FIG. 2, most of the noises have been attenuated and the diffractions are highlighted.

Figure 3:
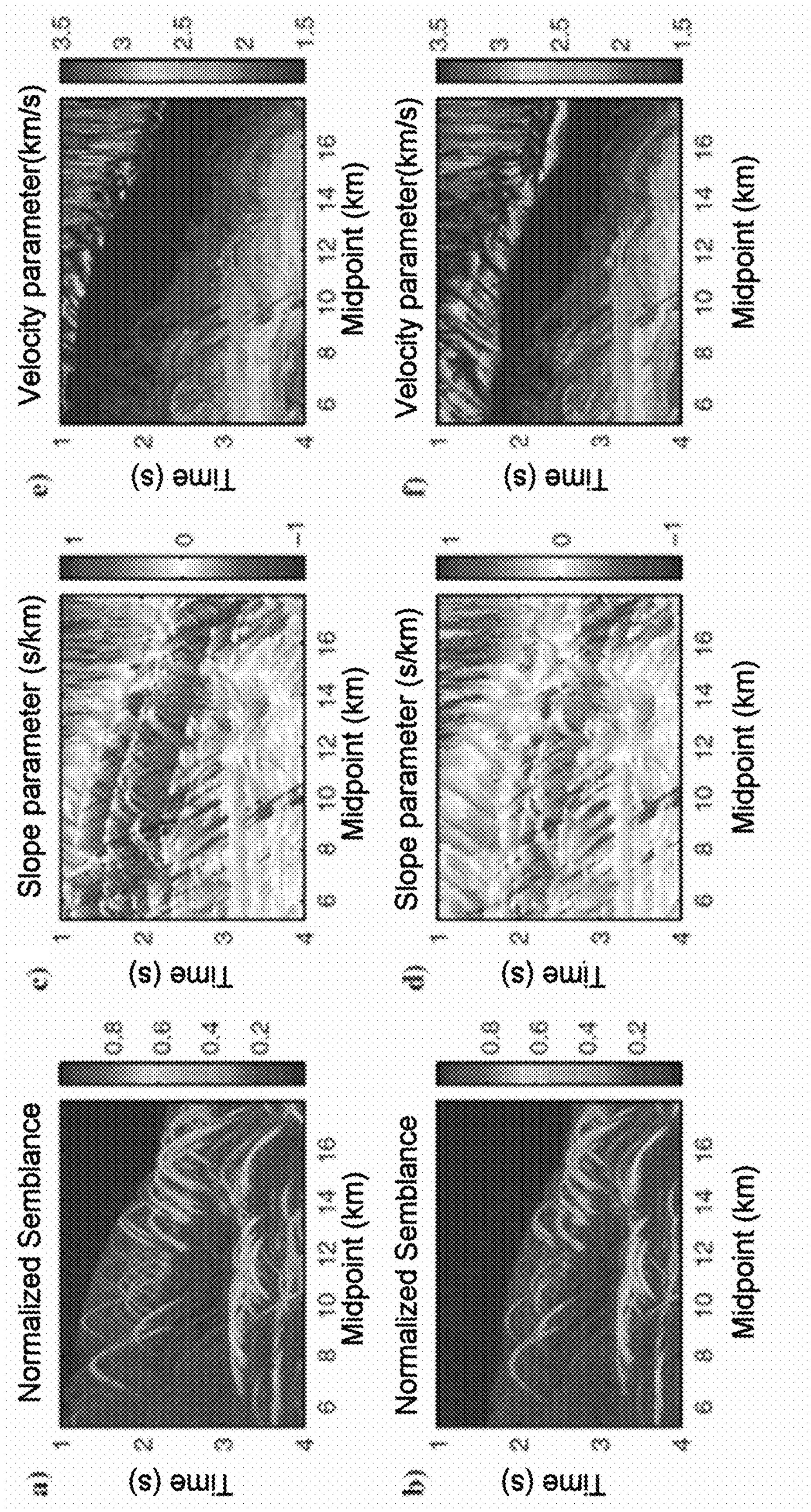
FIG. 3 represents an actual 2D data, Semblance and slope parameters along the midpoints and velocity obtained for the offsets.

In turn, FIG. 3 shows the slope parameters along the midpoints and velocity obtained during the estimation step for the 150 m and 1000 m offsets, as well as their respective coherence values (Semblance).

Specifically, FIG. 3 illustrates actual 2D data: Semblance and slope parameters along the midpoints and velocity obtained for the offsets of 150 m (above) and 1000 m (below).

Preconditioning

The data preconditioning step is able to increase the efficiency of the diffractions separation obtained by the described techniques of Diffractions separation in the Zero offset domain and Diffractions separation in the Finite offset domain.

Figure 4:
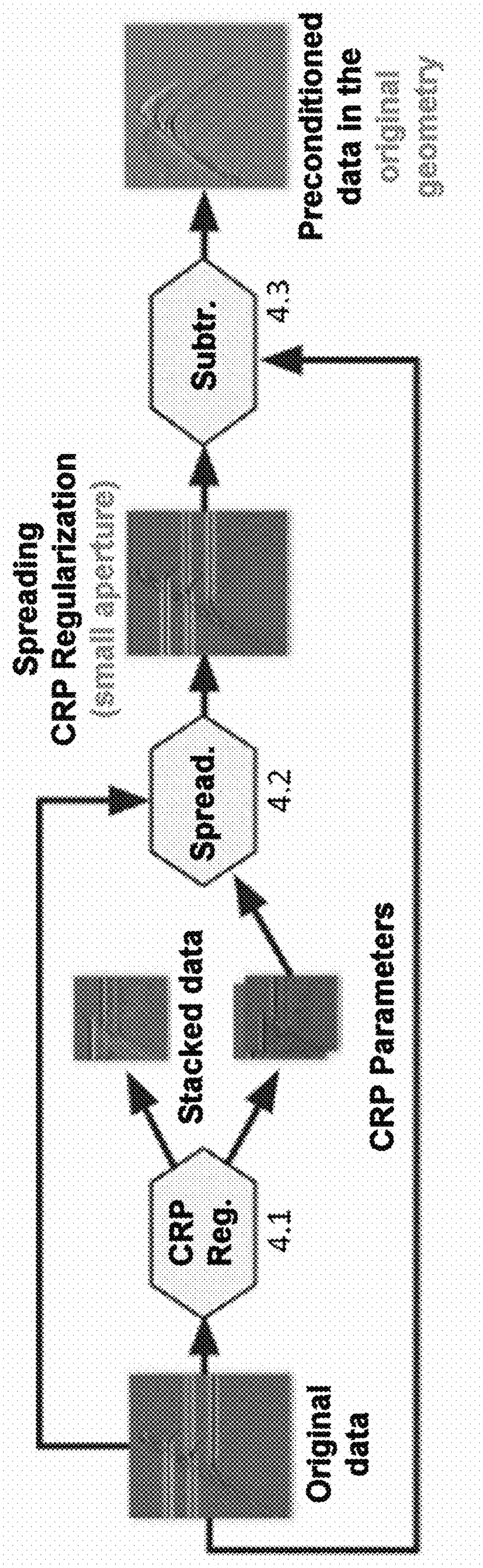
FIG. 4 presents the preconditioning flow for applying the diffractions separation techniques in the zero offset domain and in the finite offset domain.

FIG. 4 presents the preconditioning flow for applying the diffractions separation techniques in the zero offset domain and in the finite offset domain.

Specifically, according to FIG. 4, a CRP regularization 4.1 is applied to the original data to obtain the CRP parameters (slopes and velocity) and the stacked data. The CRP regularization 4.1 preserves the original geometry of the data and is performed with the usual estimation apertures in the direction of midpoints and reduced apertures in the direction of offsets, to reduce the influence of amplitude variation along the offsets. Then, a CRP spreading 4.2 in the amplitudes of the original data is performed with the CRP parameters obtained in the CRP regularization 4.1, resulting in a spread data. CRP spreading 4.2 occurs in the direction of midpoints; so, small apertures in offset are used in the step of CRP regularization 4.1. The spread data obtained with the CRP spreading 4.2 is subtracted 4.3 from the original data, sample by sample, and the result is the preconditioned data in the original geometry.

Additionally, the data preconditioning step is able to attenuate part of the energy associated with reflection events, enhancing the ability of the diffractions separation technique to enhance diffractions and allowing the use of apertures in the direction of midpoints for estimation, stacking and spreading smaller than usual.

It is worth mentioning that even without the application of the preconditioning flow, the Diffractions separation in the Zero offset domain and Diffractions separation in the Finite offset domain are capable of enhancing diffractions, but their efficiency decreases as the increased depth of imaging objectives.

The data preconditioning step is obtained by applying the CRP (Common-Reflection-Point) Regularization technique, which can be observed, for example, in the paper of Coimbra et al., 2016 (Coimbra, Tiago A.; Novais, Amélia; Schleicher, Jörg *Offset-continuation stacking: Theory and proof of concept*. Geophysics, v. 81, p. V387-V401, 2016), preserving the original geometry of the data and with estimation apertures usual in direction of midpoints and apertures reduced in the direction of offsets. This is done to reduce the influence of amplitudes variation along the offsets. Next, the kinematic parameters obtained are used to apply a spreading process to the amplitudes of the original data. Spreading only occurs in the direction of midpoints; so, small apertures at offset are used in the first step. The spread data is then subtracted from the original data, sample by sample, and the result of this operation constitutes the preconditioned data.

The attenuation of reflection events, observed in the preconditioning, happens as follows: The CRP Regularization has the feature of enhancing reflection events. By extracting kinematic parameters with this CRP technique, the events and amplitudes associated with the reflection events are identified. The reflections and diffractions show different dynamic behavior, that is, their amplitudes vary differently along the midpoints. When performing the subtraction of the original data from the spread data with small apertures (that is, smaller than the values obtained by equation 2), which was obtained through the kinematic parameters of reflections, the reflection events tend to be more attenuated than events of diffraction. The result of this subtraction, which constitutes the preconditioned data, can then be used as input data for the techniques of Diffractions separation in the Zero offset domain and Diffractions separation in the Finite offset domain.

Figure 5:
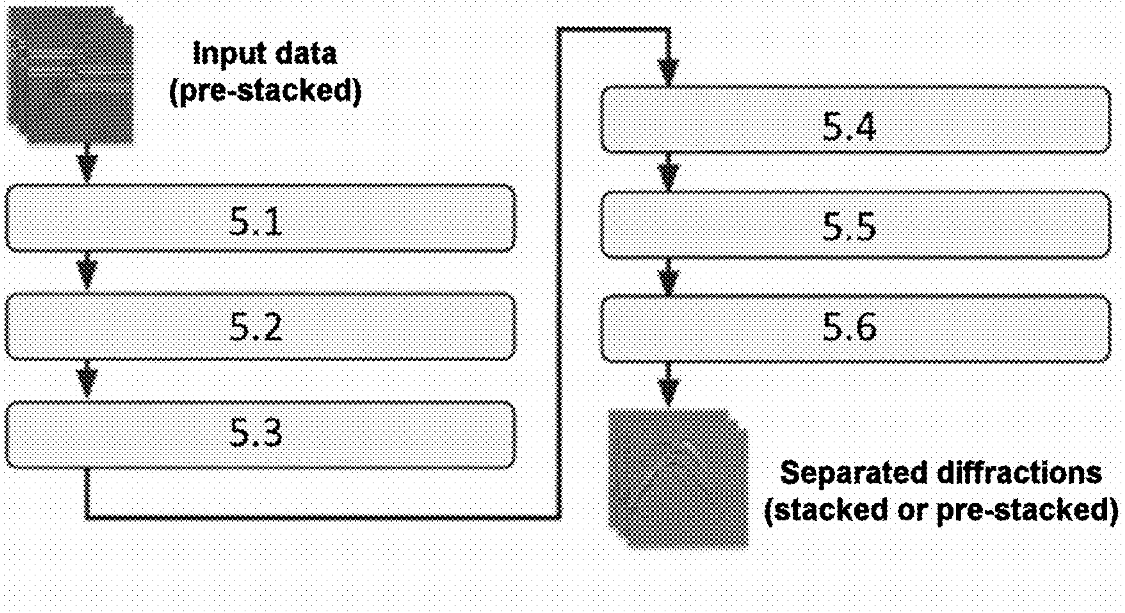
FIG. 5 displays a flowchart of the application of diffractions separation techniques for zero offset and finite offset.

In turn, FIG. 5 displays a flowchart of the method to separate information associated with diffraction events from specular information present in the seismic data, according to a preferred embodiment of the present invention.

Particularly, the method of the present invention can start with the step of obtaining an input data 5.1. The input data may comprise pre-stacked seismic data or pre-stacked and pre-conditioned seismic data.

The input data is exported in a data structure consisting of headers (hereinafter, headers) and traces, such as a SEG-Y type data structure. The SEG-Y format is a standard format developed by the Society of Exploration Geophysicists for recording seismic data, which is widely used by the industry and academic community. It is worth mentioning that the method of the present invention is independent of the file format used.

Specifically, each trace of the pre-stacked data is associated with a header, wherein the header must contain the following information: coordinates on the X and Y axes of sources, receivers and CDPs (Common-Depth Points), CDP indexes, offset, number of samples, time and azimuth sampling of the acquisition line or azimuth of the inlines. Specifically, the acquisition line azimuth applies to the 2D input data case and the inlines azimuth applies to the 3D input data case.

Ideally, the pre-stacked data should contain all the pre-processing steps necessary to perform an NMO (Normal Moveout) stack.

The step of building velocity guides 5.2 comprises providing a table containing velocity information for time samples for different indexes of CDPs (Common-Depth Points). In the step of building velocity guides 5.2, the aim is to improve the quality of the results and control the search interval of the velocity parameter, considering a velocity guide.

More specifically, in the building velocity guides step 5.2, in the case of the diffractions separation in the zero offset domain, the table containing velocity information for time samples for different indices of CDPs is interpolated, via linear interpolation, to that all time samples of all data CDPs indices contain a velocity value. The result of this interpolation is a zero offset panel containing velocities at all time samples. Such velocity values, which make up the velocity guide, in all time samples of all CDPs indices are considered as initial values in the step of estimating DSR kinematic parameters 5.3.

Additionally, in the building velocity guides step 5.2, in the case of diffractions separation in the finite offset domain, it is necessary to provide a velocity volume of the same dimension as the pre-stacked input data. For this, the same process used in the building of a zero offset panel velocities is carried out from a table. However, to guide the search for parameters in the finite offset domain, it is necessary to provide velocity values along the offsets of the volume of data to be processed. For this, velocities of each sample of the zero offset panel are replicated along the offsets, following the NMO curve (Normal Moveout) of the velocity in question. When this process is performed for all samples, the result is data in the same dimensions as the input pre-stacked data with velocities at all of its time samples and offsets. Alternatively, if a velocity table is not available, it is possible to define a search interval, containing a minimum velocity and a maximum velocity to be considered.

The step of estimating DSR kinematic parameters 5.3 comprises estimating kinematic parameters associated with the DSR traveltime for each sample of the input data considering an estimation aperture, which comprises the region in which the DSR traveltime adjustment to the input data will be evaluated, since the input data and the velocity guide are already exported. More specifically, the step of DSR kinematic parameter estimation 5.3 further comprises defining the execution parameters, where the execution parameters comprise one or more of:

Deviation of the guide velocity: defines a maximum deviation of the guide velocity, when used, to perform the search for kinematic parameters. A standard deviation value of 12% is used by default. However, the user can change this value as he deems necessary;

Coherence window: determines the width of a time range around the DSR traveltime surface where the coherence analysis will be performed. Considers a time range and stabilizes the Semblance calculation. A default value of 20 ms for the initial time sample, increasing linearly up to 24 ms for the last time sample. However, the user can change these values as he/she deems necessary;

Delimitation of the processing region: in order to facilitate and accelerate the execution of tests or even allow processing of regions of interest, it is possible to delimit a time processing region, CDPs, Inlines and Xlines;

Estimation apertures: the estimation apertures comprise the region in which input data amplitudes will be collected to evaluate its adjustment with the DSR traveltime surface for different values of kinematic parameters. This adjustment is measured using the Semblance coherence measure. To define the estimation aperture, only one value is needed, since the same aperture value is used for the midpoint and offset directions. However, it is possible to make this value vary linearly with the depth of the data. It is important to note that the reference values for this aperture must satisfy equation 2;

Output geometry: this parameter is valid only for the case of finite offset, where the user can define whether he/she wants to preserve the original pre-stacked geometry of the data or if he/she wants a regular geometry in intervals of CDPs and/or offsets. For this, it is enough to select the intervals of interest and a regular geometry will be built.

In this way, once the execution parameters are defined, the kinematic parameters that best adjust to the input data are estimated. This adjustment is measured through Semblance for different values of kinematic parameters. In the case of the diffractions separation in the zero offset domain, the estimation of kinematic parameters takes place in a zero offset panel, with time dimensions and CDP indices equal to those of the input data. For the diffractions separation in the finite offset domain, the estimation of kinematic parameters takes place in the pre-stacked domain with time dimensions, CDP indices and offsets. Particularly, the output geometry for the finite offset case can be equal to the input data geometry or regular. Furthermore, the user can define a regular offset geometry in which the kinematic parameters will be estimated.

Next, the DSR stacking step 5.4 of each sample of the input data takes place considering a stacking aperture, which comprises the region in which the amplitudes of the input data will be stacked over the DSR traveltime, which comprises stack, on the output geometry, the amplitudes of the DSR traveltime surfaces that best adjust to the input data, considering the estimation apertures. The amplitudes of the DSR traveltime surfaces that best adjust to the input data, given the apertures considered, can be stacked in the output geometry, considering the estimation apertures previously defined in the step of estimating DSR (Double Square Root) kinematic parameters (5.3).

The stacked result of the DSR stacking step 5.4, as well as the kinematic parameters estimated in the DSR kinematic parameter estimation step 5.3, are recorded in seismic data format so that they can be evaluated by the user, if necessary. Note, that for zero offset results, the result of the DSR stacking step 5.4 is a zero offset panel. In the case of finite offset, the DSR stacking step 5.4 does not reduce the geometry of the pre-stacked data, but the amplitudes are locally stacked in their respective original or regular spatial positions.

With the stacked data result of the DSR stacking step 5.4 and the kinematic parameters obtained in the DSR kinematic parameter estimation step 5.3, the amplitudes of each sample of the input data are spread, in the DSR spreading step 5.5.

Specifically, the DSR spreading step 5.5 of each pre-stacked data sample comprises defining an aperture, wherein the aperture comprises the region in which the amplitudes of the DSR stacked data obtained in the DSR stacking step 5.4 are distributed, over the DSR traveltime. Specifically, the amplitudes of the DSR stacked data are distributed by dividing the amplitude by the number of traces present in the aperture. In order to define this aperture, only a value referring to the direction of midpoints is necessary.

However, it is possible to make this value vary linearly with the depth of the data. Note that the aperture values must always be equal to or less than those used in the DSR kinematic parameter estimation step 5.3.

The result of the DSR spreading step 5.5 of each input data sample is a data with attenuated estimation noises and artifacts and with well-solved conflicting dips. In the case of diffractions separation in the zero offset domain, the spreading takes place in a zero offset panel, with time dimensions and CDP indices equal to those of the stacked data (as obtained in the DSR kinematic parameter estimation step 5.3). With respect to diffractions separation in the finite offset domain, the spreading takes place in the pre-stacked domain with time dimensions, CDP indices, in constant offset panels.

The import results step 5.6 comprises importing the results, which are one or more of: the separated, stacked or pre-stacked diffractions in a seismic processing package. In this sense, the results of the import results step 5.6, either the results in the zero offset domain or in the finite offset domain, can be loaded into a seismic data processing package of interest to the user.

According to a preferred embodiment of the method to separate information associated with diffraction events from the specular information present in the seismic data of the present invention, an application is carried out in a 2D synthetic model representative of the Brazilian pre-salt.

Figure 6:
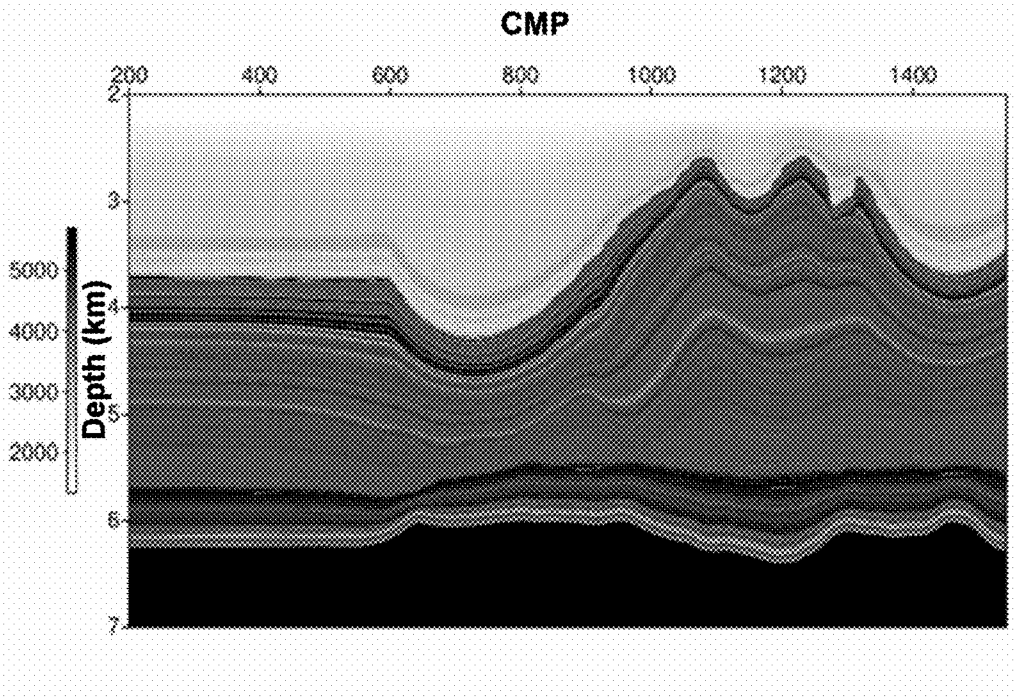
FIG. 6 presents the depth velocity model, considered in the exemplary application of the method of the present invention.

FIG. 6 presents the depth velocity model Vp, in Km/s per CMP (Common-Mid-Point), considered in the exemplary application of the method of the present invention, as mentioned above, for diffractions separation in the domains of the zero and finite offset.

Further, according to FIG. 6, the small elongated structures in a lighter color, around 5.8 km deep, simulate karsts found in the Brazilian pre-salt and constitute the objective of diffraction imaging.

In a complementary way, an end-on seismic acquisition was simulated by finite differences considering the model in FIG. 6. The sources and receivers are incremented at intervals of 24 m. The shortest offset was 168 meters and the longest offset was 8208 meters. Record sampling was 4 ms and the dominant source frequency was 30 Hz.

Figure 7:
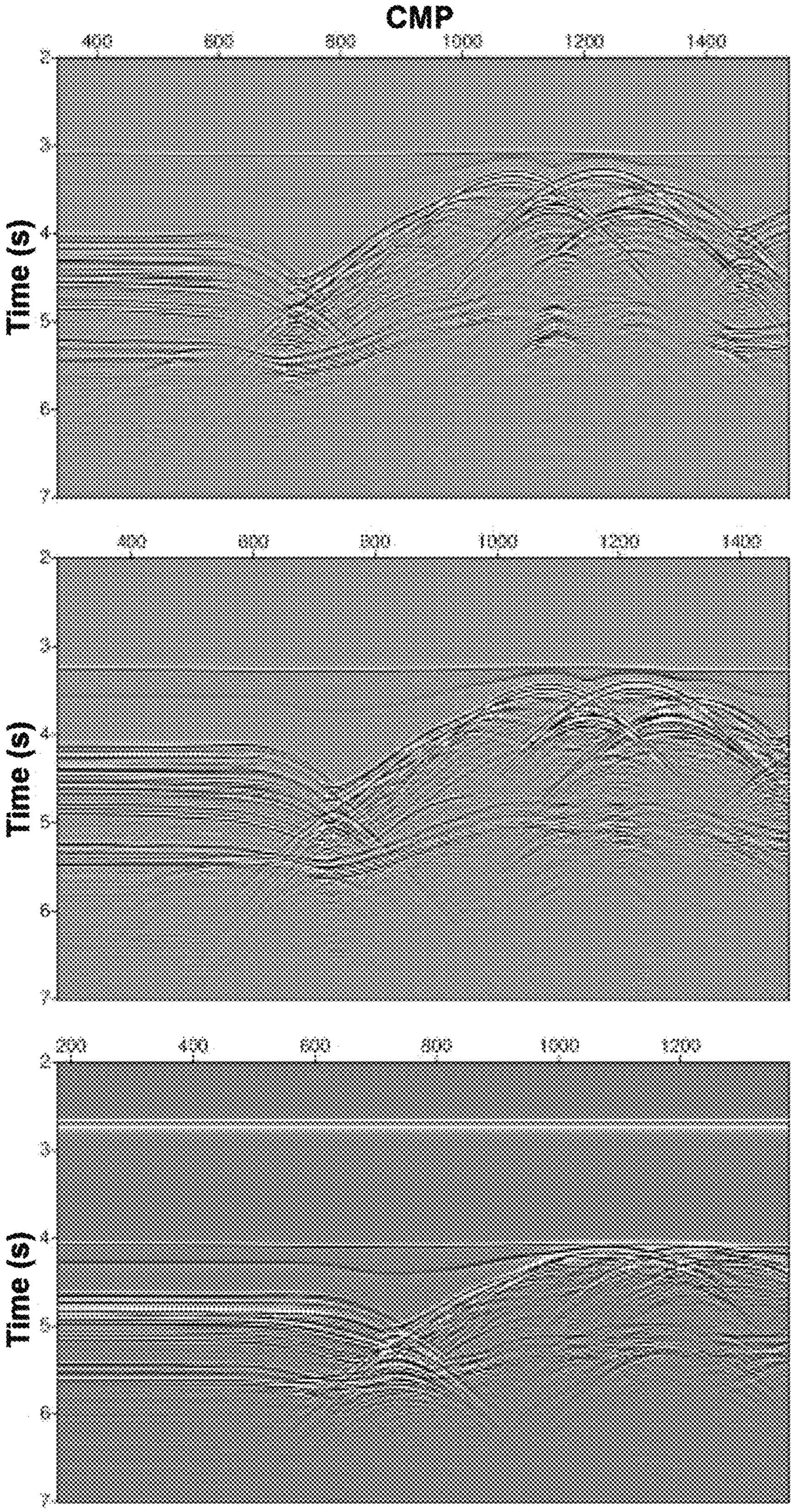
FIG. 7 displays the synthetic data with the first panel being a 168-meter offset panel, the center panel being a 1536-meter offset panel and the bottom panel being a 3960-meter offset panel.

FIG. 7 presents panels of offsets for illustration and comparison purposes, in which the graphs present data with time in seconds (s) per CMP (Common-Mid-Point), presenting synthetic data with the first panel being a 168-meter offset panel, the center panel being a 1536-meter offset panel and the bottom panel being a 3960-meter offset panel.

Preconditioning

In the exemplary application of the method of the present invention, a preconditioned data was considered before the application of diffractions separation in the finite offset domain. The obtained synthetic seismic data underwent the pre-conditioning process with CRP regularization, as shown in the flowchart shown in FIG. 4.

In this way, the original acquisition geometry was preserved and the parameters estimation configurations were: 120 m and 40 m aperture for midpoints and offsets, respectively. The maximum deviation from the velocity guide was 12.5% (the velocity model used was built by converting the depth velocity model to RMS). In the DSR spreading stage 4.2, an aperture of 40 m was considered. The resulting data was then subtracted 4.3 from the original data, sample by sample, and its result constitutes the preconditioned data.

Particularly, the preconditioned data can be seen in FIG. 8, which shows the preconditioned synthetic data for the offset panels presented in FIG. 7: panels of offsets of 168 meters (above), 1536 meters (center) and 3960 meters (below).

Figure 8:
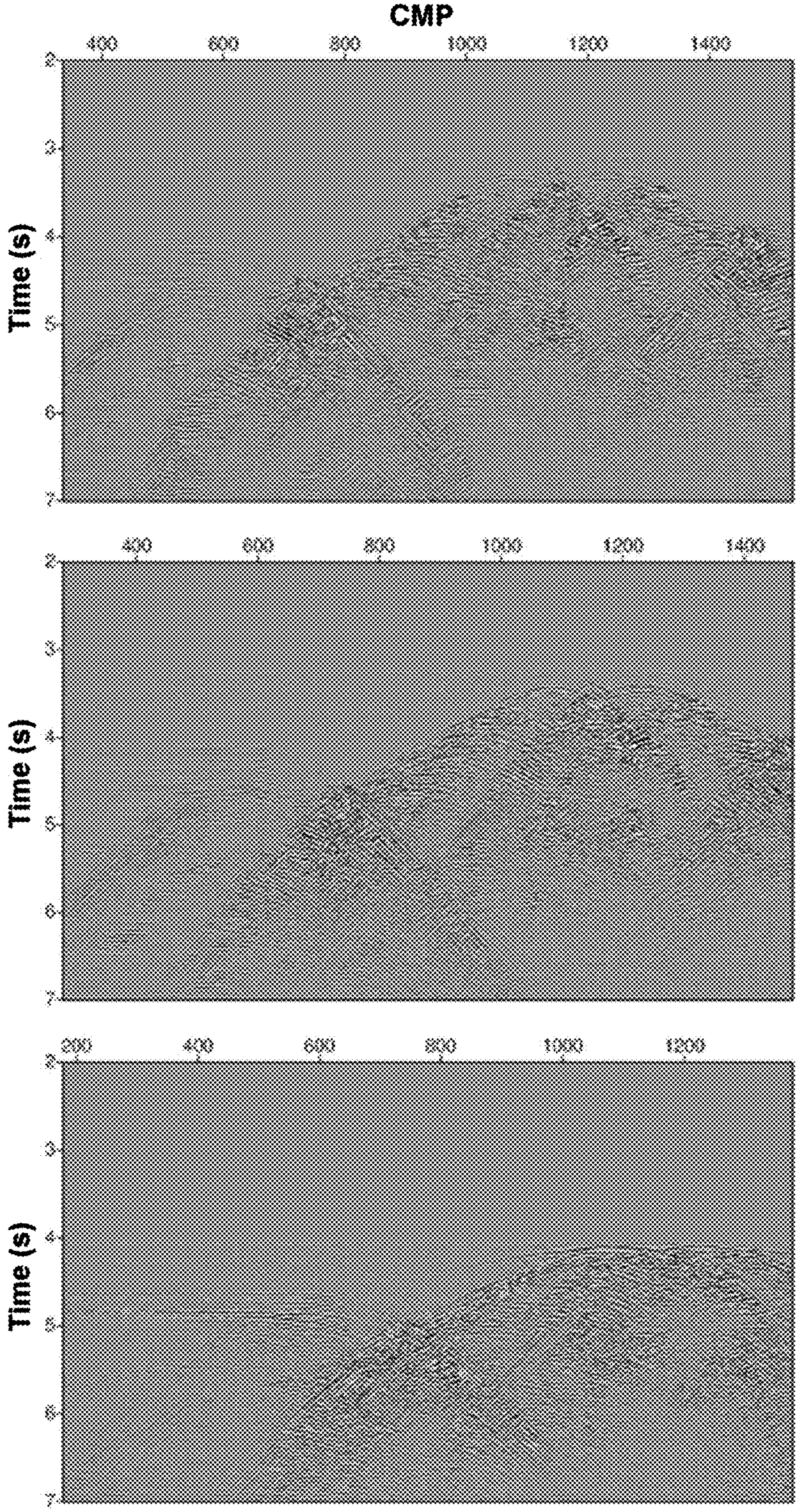
FIG. 8 shows the preconditioned synthetic data for the offset panels presented in FIG. 7.

Comparing FIGS. 7 and 8, it is possible to verify the impact of preconditioning, where reflection events, previously clearly visible, were attenuated and gave way to less energetic events, such as diffractions. Residual reflections are also present in the preconditioned data, but these are attenuated during the application of the diffractions separation technique in the zero offset domain and in the finite offset domain.

Diffractions Separation in the Zero Offset Domain

As an example of application, the diffractions separation in the zero offset domain will be considered. In this sense, the preconditioned data was used as input and the configurations for estimating domain of zero offset the execution parameters were: 600 m aperture for midpoints and offsets; maximum guide velocity deviation of 30%; and slopes were restricted to ±0.00035 s/m. Specifically, narrowing the slope search is essential, especially in the case of deep targets. In these cases, the flanks of shallower diffractions can reach deeper regions and disturb the estimation process of kinematic parameters and, consequently, impair the separation of events. Next, in the spreading step, an aperture of 400 m was considered.

Figure 9:
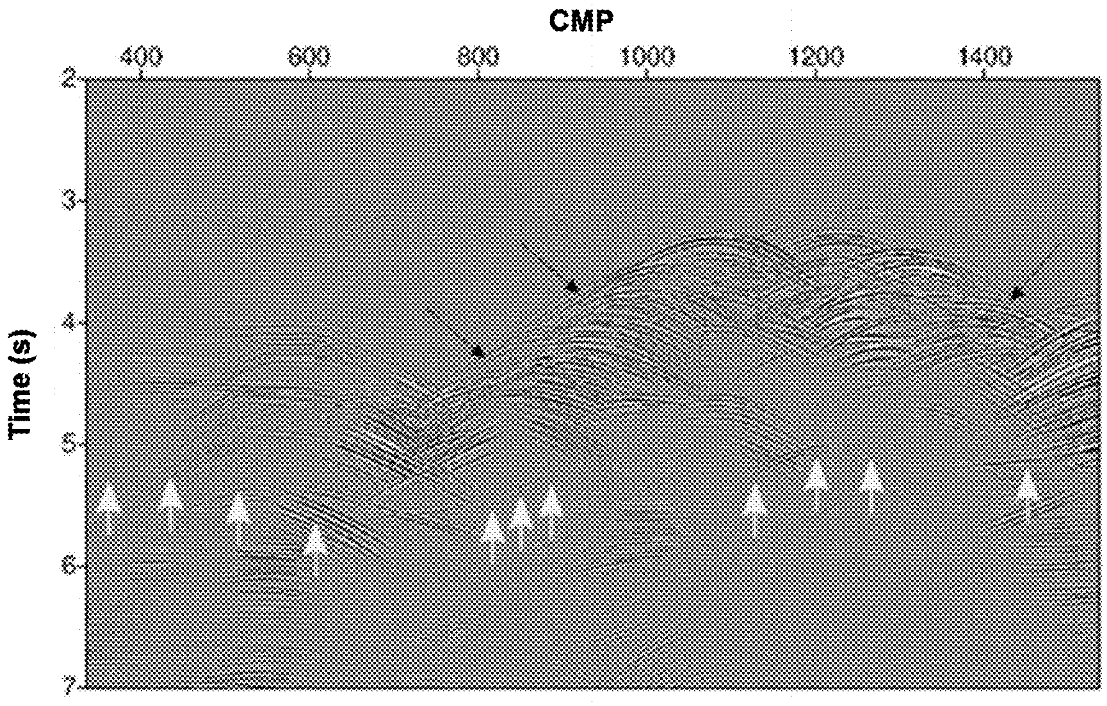
FIG. 9 presents the stacked result obtained by the diffractions separation technique in the zero offset domain.

The result obtained for the diffractions separation in the zero offset domain can be seen in FIG. 9.

FIG. 9 presents the stacked result obtained by separating diffractions in the zero offset domain. The four groups of white arrows with solid lines, at the bottom of FIG. 9, indicate diffractions associated with karst structures; and the arrows with a dotted line, at the top of FIG. 9, point to the flanks of the salt body.

Comparing FIG. 9 with the preconditioned data for the shortest offset (168 meters) of FIG. 8, the top panel, it is possible to observe that most of the noise was attenuated and the diffractions enhanced. The choice of estimation, stacking and spreading apertures plays a fundamental role in attenuating these noises. However, excessively large apertures can blur events of interest, since the traveltime approximation is no longer valid.

The white arrows with solid lines at the bottom of FIG. 9 indicate the estimated position of diffractors associated with karst structures. It is important to mention that, as it is a synthetic data, there is a large number of diffracted events, which come from the modeling and are normally not observed in actual data. Regions with high inclinations are the most affected, since the velocity model has several discontinuities due to aliasing in these positions. For this reason, inclined events, such as the sides of the salt, indicated by the upper arrows with a dashed line, in FIG. 9, present a strong presence of diffractions. Accordingly, the method of the present invention is expected to enhance these events.

Figure 10:
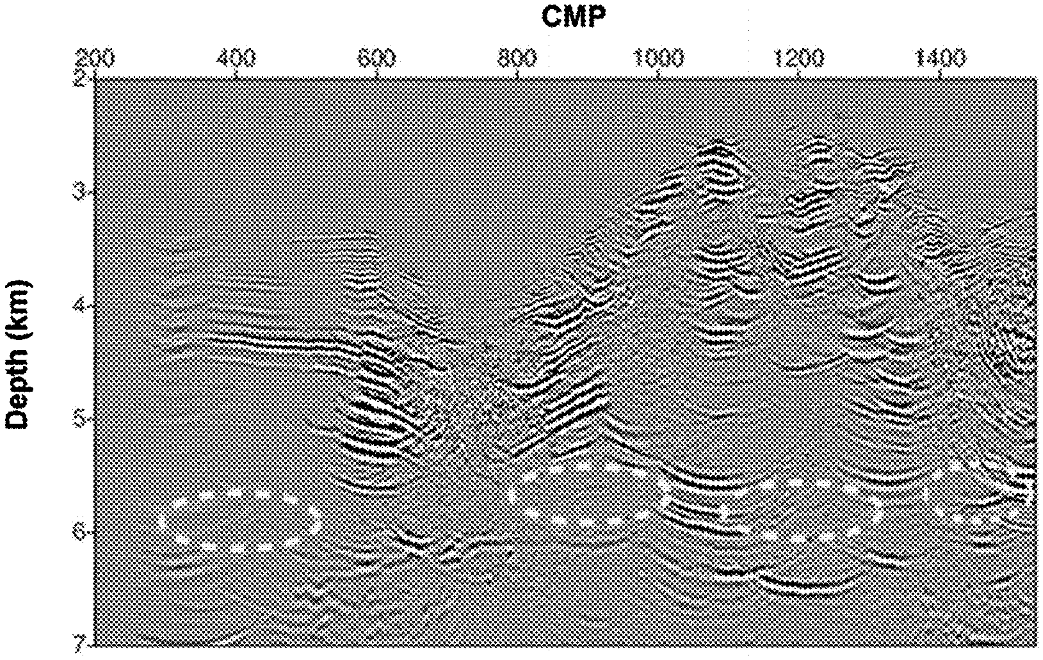
FIG. 10 illustrates the depth post-stacking Kirchhoff migration of diffractions in the offset domain.

To analyze the diffractions in depth, a Kirchhoff migration was applied, as seen in FIG. 10, since it is a stacked section.

In particular, FIG. 10 illustrates the depth post-stacking Kirchhoff migration of the diffractions in the offset domain. The four areas highlighted in dashed lines represent the expected position of the karst structures in the depth original model.

For comparison purposes, two other migrated images of the original data were generated. The first migrated image of the original data is presented in FIG. 11, which shows a depth pre-stacking Kirchhoff migration of the original stacked data performed with the same parameters and velocity model as in FIG. 10. The second migrated image of the original data is presented in FIG. 12, which shows an RTM (Reverse Time Migration) migration of the original data.

Figure 12:
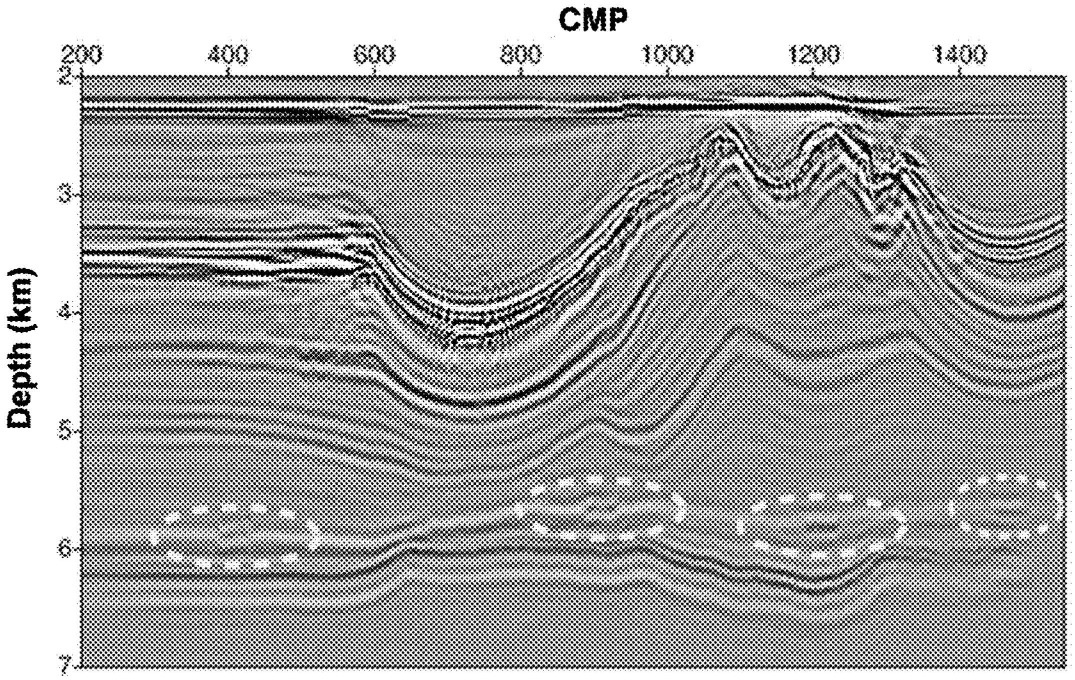
FIG. 12 displays the RTM imaging of the original data of reflections.

Observing FIG. 12, it can be seen that the four karst structures highlighted by dashed lines are very well defined and with consistent positioning with the depth model. FIG. 12 is used as a reference to analyze the result of the Kirchhoff migration of the original data and the diffractions at zero offset.

Figure 11:
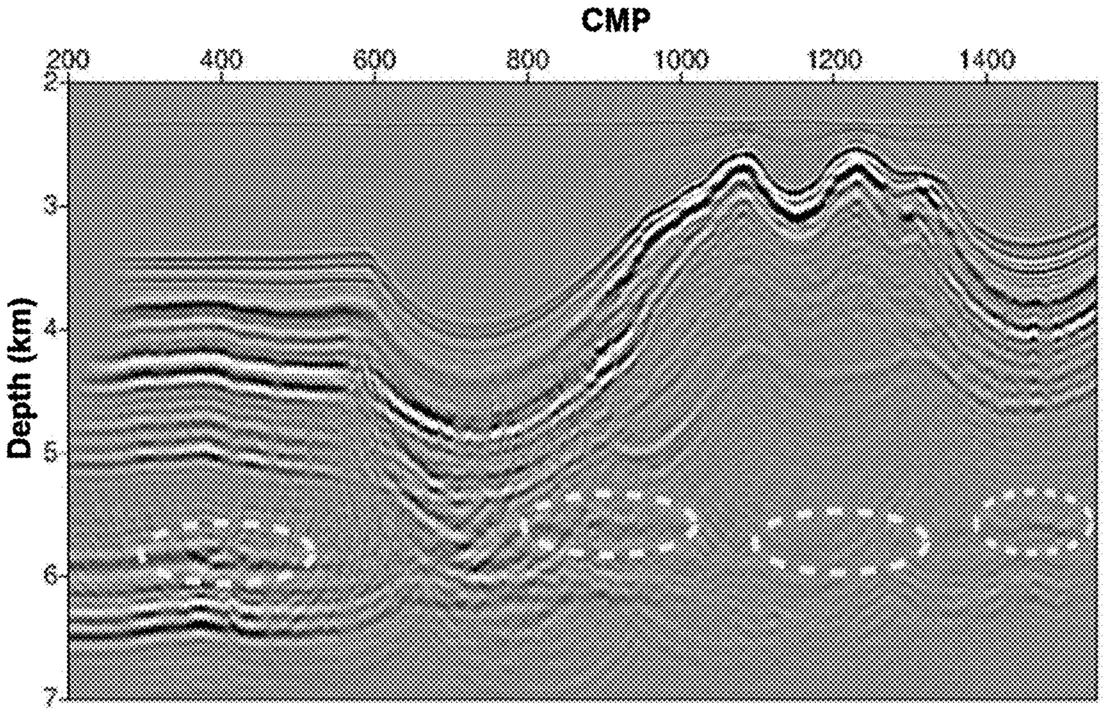
FIG. 11 shows the depth pre-stacking Kirchhoff migration of the original data.

In the case of FIG. 11, only the karst structure located further to the left, which is easily identifiable without a priori information about the model. This is an expected result, since the overburden is simple in this region and that post-stacking migrations are not adequate for complex situations such as those present in the central and rightmost region of the data.

When comparing FIGS. 11 and 12 with FIG. 10 (the migration of diffractions at zero offset), it is observed that the migration of FIG. 10 was not able to correctly image and separate the events of interest, despite these events being visible on the stacked data, as shown in FIG. 9.

These results are expected for situations of complex geology and, for this reason, it is necessary to apply the diffractions separation technique for the finite offset domain (pre-stacked). Working in the finite offset domain, that is, without performing a stacking that modifies the data geometry to zero offset, allows taking into account variations in the kinematics of events along the offsets and also enables the use of more accurate migration techniques, such as RTM migration. In this situation, diffractions separation in the finite offset domain is applied.

The result of applying diffractions separation in the zero offset domain is extremely dependent on the overburden. However, there are situations in which the diffractions separation in the zero offset domain can provide relevant results, which make it possible to correlate regions of high concentration of diffractions (high amplitudes) with depths, where problems occurred during well drilling.

Diffractions Separation in the Finite Offset Domain

To obtain diffraction results in finite offset, as well as in zero offset, the same preconditioned data and the same configurations for estimation of kinematic parameters, stacking and spreading were used.

Figure 13:
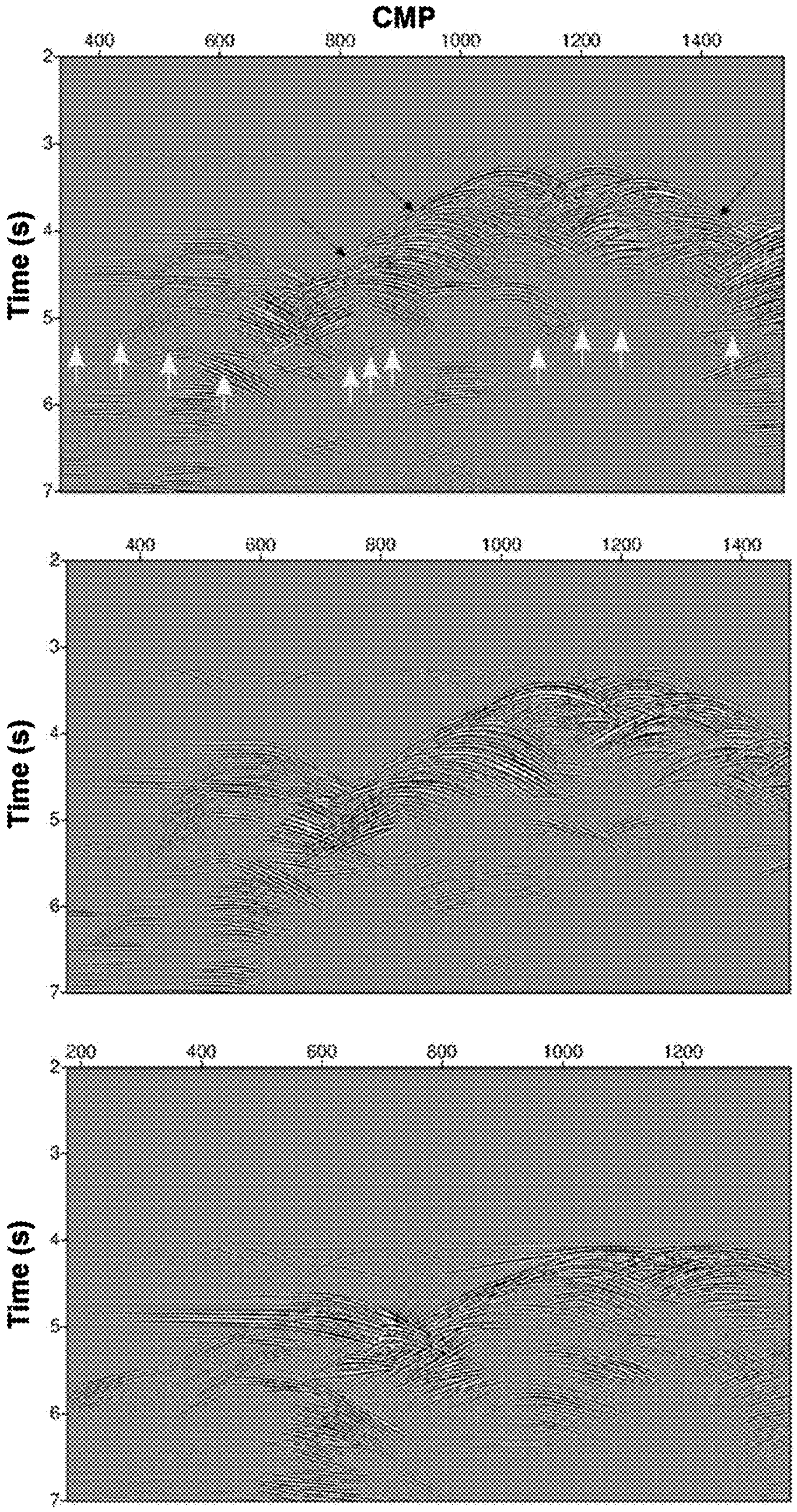
FIG. 13 presents the diffraction results at the finite offset for the offset panels.

FIG. 13 presents the diffraction results at finite offset for the offset panels: 168 meters (above), 1536 meters (center) and 3960 meters (below). The four groups of white arrows with solid lines at the bottom indicate diffractions associated with karst structures; and the three arrows with dotted lines at the top indicate the flanks of the salt body.

Specifically, FIG. 13 shows the result obtained for diffractions at finite offset for three offset panels, which can be directly compared with the offset panels of the original data, as shown in FIG. 7; and with the preconditioned data, in FIG. 8. It is possible to notice that the same reflections attenuation factor reached in the zero offset now also occurs in the finite offset panels. This makes it possible to follow specific events along the offsets, such as those highlighted by the lower arrows, white and with solid lines, in FIG. 13. In addition, it is also noted that there is a strong presence of diffractions associated with the sides of the salt body, highlighted by the top arrows, with dashed lines in FIG. 13.

Figure 14:
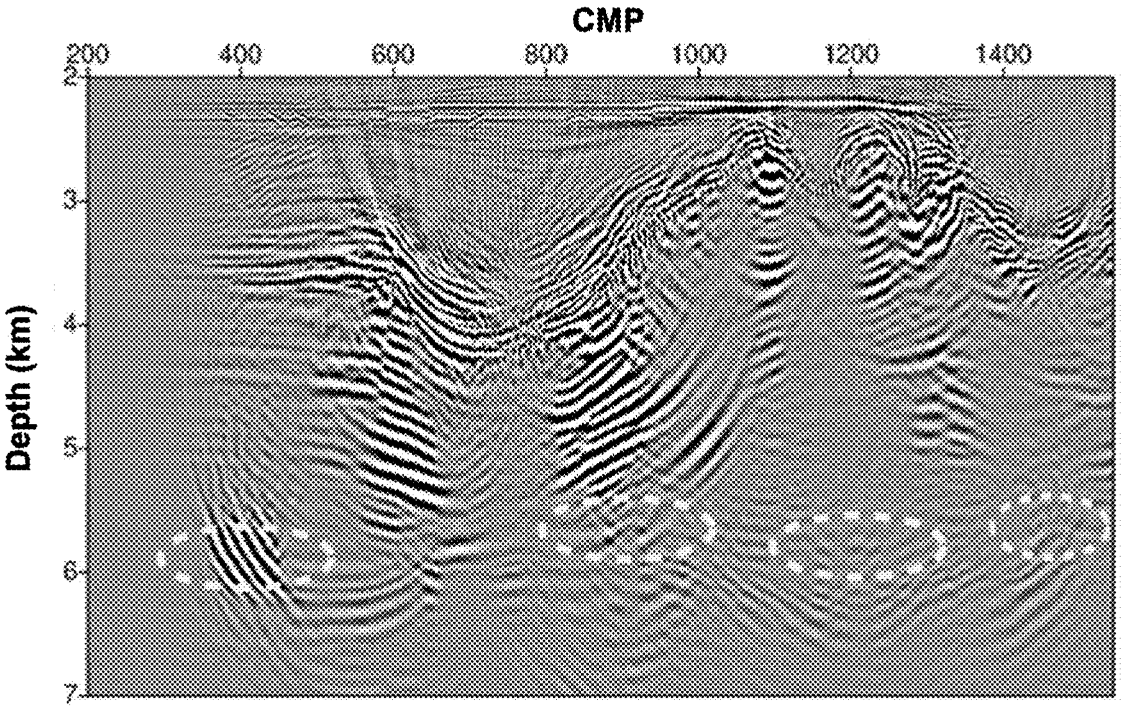
FIG. 14 represents the RTM imaging of diffractions in the finite offset domain.

Once with a pre-stacked data of diffractions, provided by the diffractions separation in the finite offset domain, it is possible to perform an RTM migration, as shown in FIG. 14.

FIG. 14 shows the RTM imaging of diffractions in the finite offset domain. The four areas highlighted in FIG. 14, at the bottom, represent the expected position of the karst structures in the depth original model.

According to FIG. 14, the karsts are more easily identifiable and are also correctly positioned. Comparing FIG. 14 with the result obtained for zero offset, in FIG. 10, the gain in quality and precision is evident. This improvement is due to the use of an adequate migration technique and also because there are other offsets to contribute to constructive and destructive interference processes, attenuating reflections and enhancing diffractions.

The exemplary application of the method of the present invention, described above, presented the application of said method in a marine 2D synthetic data modeled through finite differences from a velocity field representative of the Brazilian pre-salt. The model contains small elongated structures, representing karsts, which constitute the objectives of diffraction imaging. As input data for both diffractions separations in the domain of finite and zero offset, the preconditioned data was considered. Data preconditioning is an essential tool to ensure satisfactory results in deep regions.

Furthermore, the attenuation of reflection events allows using smaller estimation apertures. This reduces the computational cost and also ensures a better adjustment of the traveltime to the diffraction events in situations of greater geological complexity. The time stacked result, obtained by separating diffractions in the zero offset domain, was able to identify events associated with karsts. However, due to the zero offset nature of the result, the imaging options were limited to the use of depth post-stacking Kirchhoff-type migrations.

However, the migrated result for zero offset diffractions was not able to explicitly identify the events of interest. However, weak responses, probably associated with karsts, are visible in the expected position. This result is, in a way, expected due to the complex geological model considered.

In this way, for situations like this, the most indicated is to use a pre-stacked data of diffractions and to use migration techniques in the finite offset domain, such as reverse time migration (RTM).

The obtained time pre-stacked result, as well as in the case of zero offset, was able to identify the karst responses. Furthermore, diffractions separation in the finite offset domain also detected these events at longer offsets. This result was depth migrated, via RTM migration. All karst structures of interest were imaged and correctly positioned.

Those skilled in the art will value the knowledge presented herein and will be able to reproduce the invention in the presented embodiments and in other variants, encompassed by the scope of the appended claims.

The invention claimed is:

1. A method for identifying geological structures, the method comprising:

obtaining an input data, wherein the input data is a pre-stacked seismic data obtained from a geological structure;

building a velocity guide of the same dimension as the input data comprising:

providing a table containing velocity information for time samples of a zero offset panel for different CDPs (Common-Depth Points) indices; and replicating the velocities of each time sample of the zero offset panel along offsets of the input data, following the NMO (Normal Moveout curve), estimating DSR (Double Square Root) kinematic parameters constrained by the velocity guide by estimating kinematic parameters associated with the DSR travel time for each sample of the input data considering an estimation aperture, which comprises the region in which the DSR travel time adjustment to the input data will be evaluated;

DSR stacking each input data sample considering a stacking aperture, which comprises the region in which the input data amplitudes will be stacked over the DSR travel time;

DSR spreading each sample of the pre-stacked data by defining an aperture, wherein the aperture comprises the region in which the amplitudes of the DSR stacked data obtained in the DSR stacking step are distributed over the DSR traveltime; and generating a diffraction cube from the DSR spread samples, the diffraction cube indicating the presence of karstified or fractured areas in the geological structure, wherein the generated diffraction cube enhances diffraction events and attenuates specular reflection energy.

2. The method of claim 1, wherein building velocity guides further comprises interpolating the table containing velocity information for time samples for different CDPs indices via linear interpolation.

3. The method of claim 1, wherein estimating DSR (Double Square Root) kinematic parameters further comprises defining the execution parameters.

4. The method of claim 3, characterized in that the execution parameters comprise one or more of: guide velocity deviation, coherence window, processing region delimitation, estimation apertures and output geometry.

5. The method of claim 1, wherein estimating DSR kinematic parameters further comprises estimating the DSR kinematic parameters that adjusted based on the input data, and wherein the adjustment is measured through semblance for different values of kinematic parameters.

6. The method of claim 1, wherein DSR stacking comprises stacking in the output geometry the amplitudes of the DSR travel time surfaces adjusted to the input data, based on the estimation apertures defined in the DSR kinematic parameters.

7. The method of claim 1, wherein DSR spreading comprises spreading, in the output geometry, the stacked amplitudes of the DSR stacking.

8. The method of claim 3, wherein estimating DSR kinematic parameters further comprises estimating the DSR kinematic parameters that adjusted based on the input data, and wherein the adjustment is measured through semblance for different values of kinematic parameters.

* * * * *